(12) United States Patent
Gardner (10) Patent No.: US 6,945,424 B1
(45) Date of Patent: Sep. 20, 2005

(54) NEWSPAPER RECYCLING CONTAINER (75) Inventor: Scott R. Gardner, Rockaway Township, NJ (US)

(73) Assignee: Intercycle LLC, Wayne, NJ (US)

( * ) Notice: Subject to any disclaimer, the term of this patent is extended or adjusted under 35 U.S.C. 154(b) by 154 days.

(21) Appl. No.: 10/353,393

(22) Filed: Jan. 29, 2003

(51) Int. Cl.[7] .............................................. B65D 8/06
(52) U.S. Cl. ..................... 220/600; 220/625; 206/83.5; 229/122.31; 100/34
(58) Field of Search ................................. 220/600, 629, 220/633, 62, 62.1, 503, 505, 625, 4.28, 4.29, 220/6; 229/194, 172, 174, 165, 192, 197, 229/117.24, 122.31, 104; 206/83.5, 449, 206/451; 211/50; 222/490; 100/34, 912; 312/34.8; 53/592; 221/63, 33; 129/122.31

(56) References Cited

U.S. PATENT DOCUMENTS

| 2,321,802 | A |   | 6/1943  | Deubener |
| 2,485,419 | A | * | 10/1949 | Thompson ................... 100/34 |
| 2,744,461 | A |   | 5/1956  | Genco |
| 3,241,738 | A | * | 3/1966  | Freiman ............... 229/120.011 |
| 3,606,134 | A | * | 9/1971  | Engle ..................... 229/122.31 |
| 3,903,789 | A | * | 9/1975  | Hurley .......................... 100/34 |
| 4,150,612 | A | * | 4/1979  | Kessler ........................... 100/2 |
| 5,004,099 | A | * | 4/1991  | Carpenter et al. ......... 206/83.5 |
| 5,005,709 | A |   | 4/1991  | Stokes |
| 5,114,020 | A | * | 5/1992  | Martin ......................... 211/50 |
| 5,690,024 | A |   | 11/1997 | Järund |
| 6,227,442 | B1 | * | 5/2001 | Evans, Jr. .............. 229/122.31 |
| 6,374,728 | B1 |   | 4/2002 | Baillie |

* cited by examiner

Primary Examiner—Lee Young
Assistant Examiner—Harry Grosso
(74) Attorney, Agent, or Firm—Richard M. Goldberg (57) ABSTRACT

A newspaper recycling container includes a main body having a peripheral sidewall formed by a plurality of panels hingedly connected together, the panels including tab sections at lower edges thereof which can be bent inwardly and secured to an adjacent panel to retain the main body in a box-like configuration; and a bottom wall positioned on the bent tab sections so as to be spaced above a ground surface on which the newspaper recycling container is positioned and to facilitate retention of the main body in the box-like configuration.

15 Claims, 11 Drawing Sheets

NEWSPAPER RECYCLING CONTAINER

BACKGROUND OF THE INVENTION

The present invention relates generally to newspaper recycling containers, and more particularly, is directed to a newspaper recycling container that can be easily assembled from a knocked-down arrangement and which holds the newspapers in spaced relation above ground level.

Newspaper recycling containers are well-known in the art. Generally, such containers are made from pre-assembled, rigid boxes and are therefore difficult to ship. Also, such containers are generally made from a relatively heavy material which also adds to shipping costs. Many of these containers provide the bottom wall at ground level, with the newspapers stacked thereon so that any moisture at the ground level can seep through the bottom wall into the newspapers held thereon.

Although it is known to provide a knocked-down newspaper recycling container, for example, as disclosed in U.S. Pat. No. 2,321,802 to Deubener, the container is held in a set-up arrangement solely by means of the separate bottom wall which is placed therein. This, however, does not provide a great amount of securement to maintain the newspaper container in the set-up position. For example, if the bottom member 12 which can be formed of corrugated paper, gets wet, the structural integrity of the container is reduced.

U.S. Pat. No. 2,744,461 to Genco also discloses a newspaper recycling container formed from a flattened blank. However, to secure the container in the open configuration, the side flap must be secured by staples or the like to the adjacent flap. Similarly, in U.S. Pat. No. 5,005,709 to Stokes, the flattened blank of corrugated material is secured together by adhesive at the side flaps. This, however, prevents the disassembly and re-flattening, for storage and/or shipping, of the newspaper recycling container at a later time.

OBJECTS AND SUMMARY OF THE INVENTION

Accordingly, it is an object of the present invention to provide a newspaper recycling container that overcomes the problems with the aforementioned prior art.

It is another object of the present invention to provide a newspaper recycling container that can be releasably secured in an assembled configuration from a flattened state, and can be easily disassembled back to the flattened state.

It is still another object of the present invention to provide a newspaper recycling container having two securing legs at adjacent walls of each corner which are releasably secured together to maintain the container in the open configuration.

It is yet another object of the present invention to provide a newspaper recycling container in which the four sets of securing legs are also used to hold the bottom wall at a position spaced above ground level to prevent water from reaching the stacked newspapers.

It is a further object of the present invention to provide a newspaper recycling container which also includes a knocked-down string holder fixed to one side wall and which can be releasably configured in an open, assembled state for holding a ball of string.

It is a still further object of the present invention to provide a newspaper recycling container which is easy to use and economical to manufacture.

In accordance with an aspect of the present invention, a newspaper recycling container includes a main body having a peripheral sidewall formed by a plurality of panels hingedly connected together, the panels including tab sections at lower edges thereof which can be bent inwardly and secured to an adjacent panel to retain the main body in a box-like configuration; and a bottom wall positioned on the bent tab sections so as to be spaced above a ground surface on which the newspaper recycling container is positioned and to facilitate retention of the main body in the box-like configuration.

The tab sections of adjacent panels are releasably connected together to maintain the main body in a predetermined configuration. Specifically, adjacent tab sections have recesses for mating with recesses of tab sections of adjacent panels. At least some of the recesses include a flared opening to enable easy securement of the tab sections together. The tab sections are hingedly secured at lower edges of the panels. In addition, the panels are formed with recesses at lower edges thereof when the tab sections are bent inwardly and secured to adjacent panels.

A string holder is also secured to the main body. The main body and the string holder can be oriented in a flattened state for shipping and storage.

A cover is also provided for covering the main body.

Preferably, the main body and the bottom wall are formed from a plastic material.

Further, the bottom wall includes a plurality of slits through which a string section can be releasably inserted. The bottom wall also includes four slits, each arranged perpendicular to an adjacent slit and all slits meeting at a center point, each slit terminating in a small opening in the bottom wall.

Also, the peripheral side wall has a plurality of notches spaced therearound at an upper edge thereof for holding string sections, and a slit extending from a lower end of each notch.

The above and other objects, features and advantages of the invention will become readily apparent from the following detailed description thereof which is to be read in connection with the accompanying drawings.

DETAILED DESCRIPTION

Figure 4:
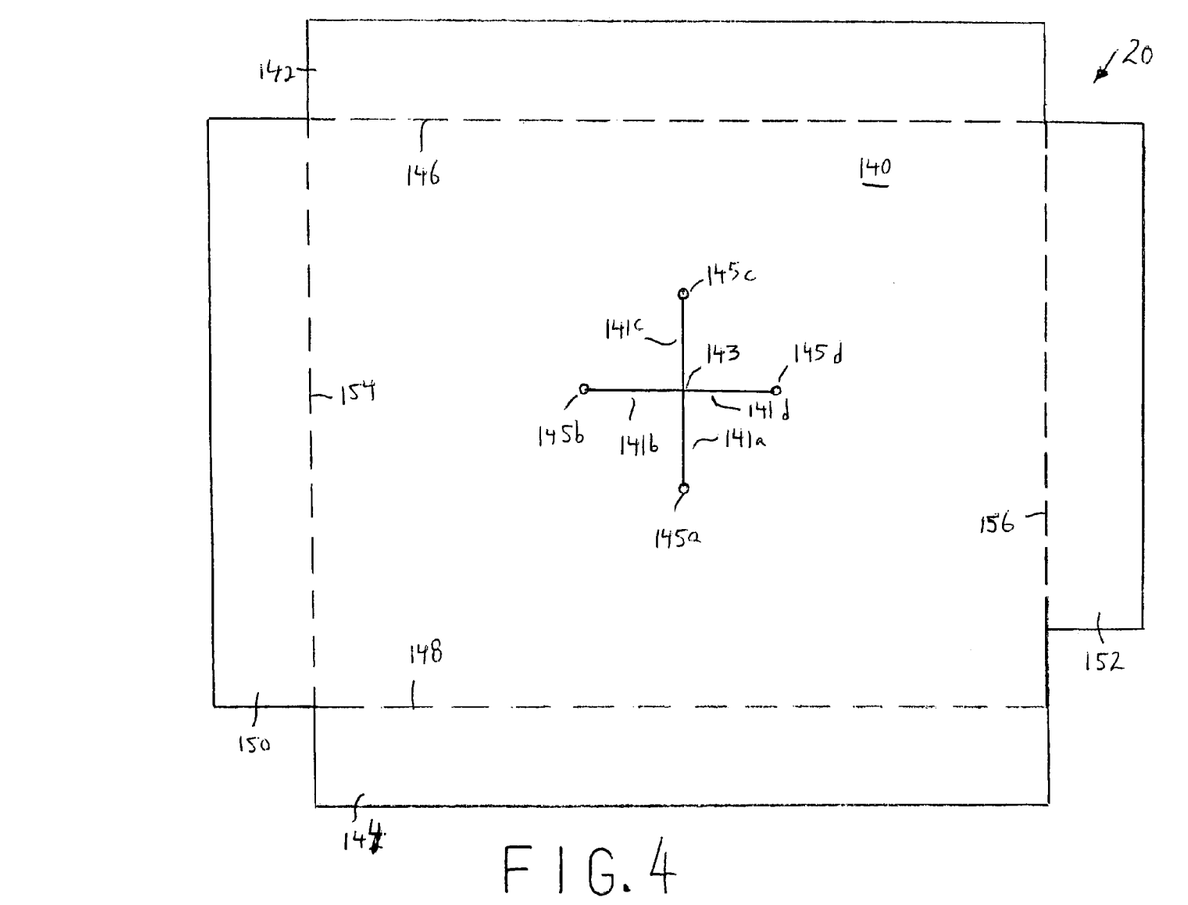
FIG. 4 is a top plan view of a blank used for forming the bottom wall.
Figure 5:
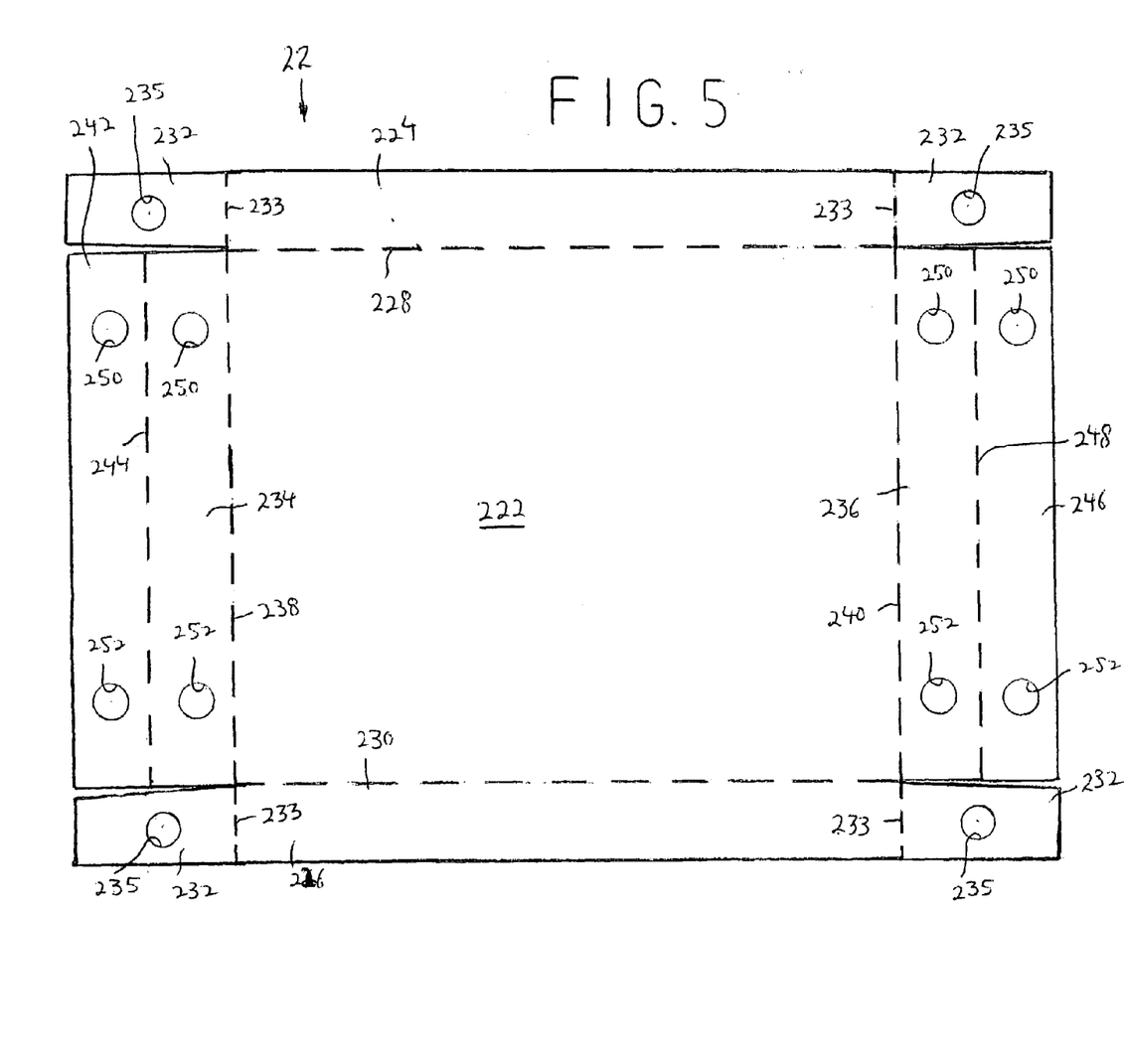
FIG. 5 is a top plan view of a blank used for forming the top cover.
Figure 6:
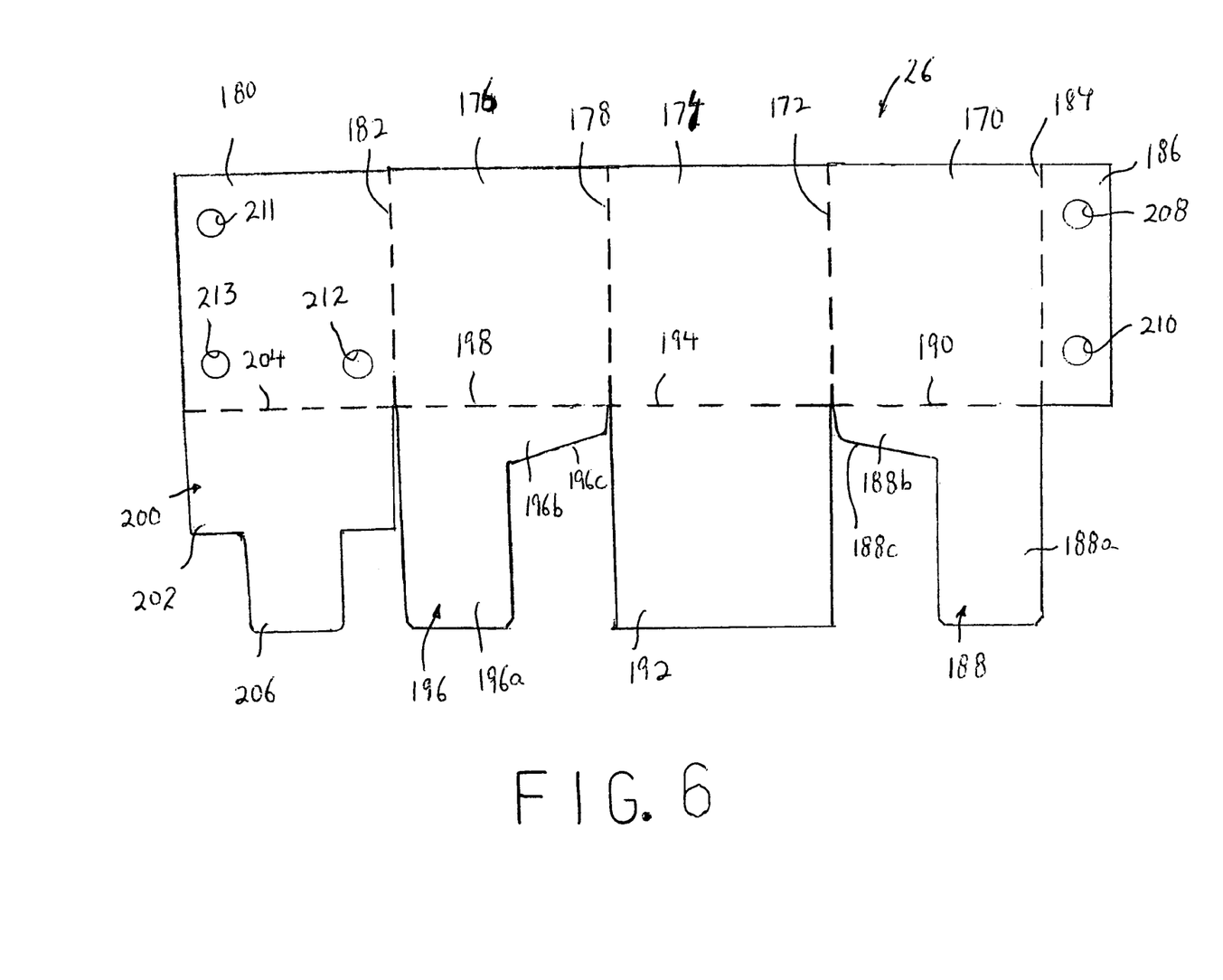
FIG. 6 is a top plan view of a blank used for forming the string holder.

Referring to the drawings in detail, a newspaper recycling container 10 according to the present invention includes a main body 12, a bottom wall 14 and a top cover 16. As shown in FIGS. 3–6, main body 12 is formed from a blank 18 (FIG. 3), while bottom wall and top cover 16 are formed from blanks 20 and 22 (FIGS. 4 and 5). A string holder 24 secured to main body 12 is formed from a blank 26 (FIG. 6).

Figure 3:
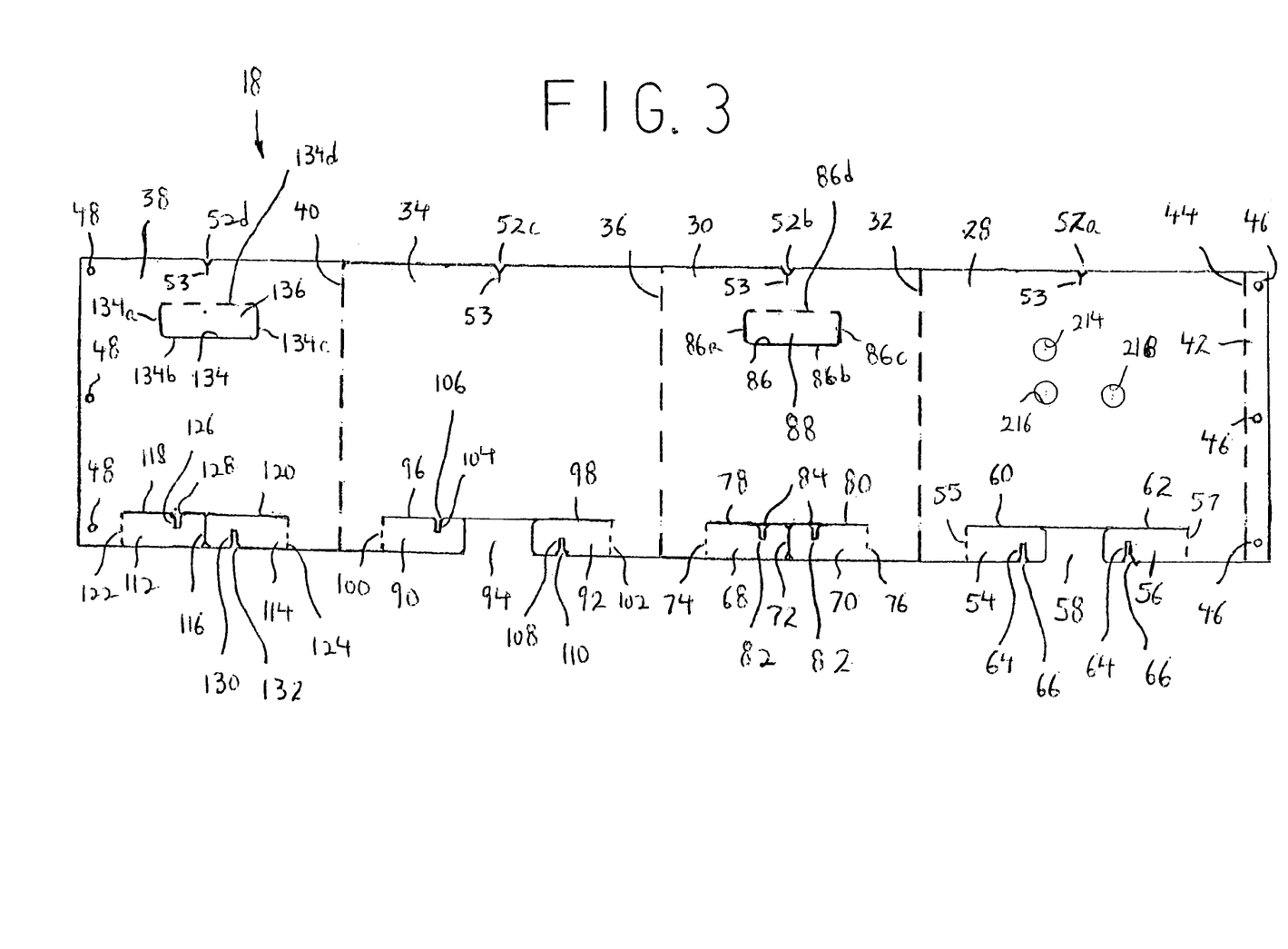
FIG. 3 is a top plan view of a blank used for forming the main body.

Referring to FIG. 3, blank 18 for forming main body 12 includes a first rectangular panel 28 connected to a second rectangular panel 30 along a fold line 32. The opposite edge of rectangular panel 30 is connected to a third rectangular panel 34 along a fold line 36, and the opposite edge of rectangular panel 34 is connected to a fourth rectangular panel 38 along a fold line 40.

A narrow rectangular strip 42 is connected at the opposite free edge of rectangular panel 28 along a fold line 44. Three holes 46 are formed with equal spacing therebetween in narrow strip 42, and holes 48 are formed in rectangular panel 38 adjacent the free edge thereof, with the same spacing as holes 46. In this manner, when blank 18 is folded along fold lines 32, 36, 40 and 44, to form a rectangular box structure, holes 46 and 48 are in alignment with each other and are secured together by rivets 50.

Preferably, rectangular panels 28, 30, 34 and 38 and narrow strip 42 are formed from a corrugated plastic material, and fold lines 32, 36, 40 and 44 are formed by living hinges.

Each rectangular panel 28, 30, 34 and 38 includes a V-shaped notch 52*a*–52*d*, respectively, centrally at the upper edge thereof, the purpose for which will become apparent from the description hereafter. The lower end or apex of each V-shaped notch 52*a*–52*d* is connected with a vertical slit 53.

The lower end of rectangular panel 28 includes inwardly extending tab sections 54 and 56 which face each other and the inner edges thereof which are separated by a central gap 58. Tab sections 54 and 56 are permitted to be folded inwardly by reason of cut lines 60 and 62, respectively, and are folded along fold lines 55 and 57 which are spaced respectively from fold lines 32 and 44. Further, each tab section 54 and 56 is formed with a recess or slit 64 near the inner end thereof, each recess 64 having a flared opening 66 at the lower edge thereof, the purpose for which will become apparent from the discussion hereinafter.

Rectangular panel 30 also includes two inwardly extending tab sections 68 and 70 with the inner edges separated from each other but in contact with each other along a contact line 72. Tab sections 68 and 70 can be bent inwardly along fold lines 74 and 76, respectively, due to cut lines 78 and 80, respectively. Fold lines 74 and 76 are spaced from fold lines 36 and 32, respectively. The upper edges of tab sections 68 and 70 adjacent cut lines 78 and 80 include recesses or slits 82 with flared openings 84.

Rectangular panel 30 also includes a handle opening 86 which is cut along three edges 86*a*, 86*b* and 86*c* and which forms a fold line along its upper edge 86*d*. As a result, a flap 88 is formed in covering relation to handle opening 86 and is hinged along fold line 86*d* so that it can be pushed in for grasping and carrying of main body 12.

Rectangular panel 34 includes two tab sections 90 and 92 at the lower edge thereof which have their inner edges spaced by a central gap 94 and which have their upper edges separated from the remainder of section 34 by cut lines 96 and 98, respectively, so that tab sections 90 and 92 can be bent inwardly along fold lines 100 and 102, respectively, which are spaced from fold lines 40 and 36. In effect, tab sections 90 and 92 are constructed in the same manner as tab sections 54 and 56, except with respect to the recesses 64. Specifically, a first recess 104 extends downwardly from a flared opening 106 at cut line 96 of tab section 90, while a recess 108 extends upwardly from a flanged opening 110 at the lower edge of tab section 92.

Rectangular panel 38 includes two tab sections 112 and 114 which have their inner edges separated but in contact with each other along a contact line 116. The upper edges of tab sections 112 and 114 are separated from the remainder of rectangular panel 38 by cut lines 118 and 120, respectively, and can be folded inwardly along fold lines 122 and 124, which are spaced from the free edge of rectangular panel 38 and fold line 40, respectively. A recess 126 extends from a flared opening 128 at the upper edge of tab section 112 at cut line 118, while a recess or 130 extends from a flanged opening 132 at the lower edge of tab section 114.

Rectangular panel 38 also includes a handle opening 134 which is formed by cut lines 134*a*–134*c* at the side edges and lower edge, and an upper edge 134*d* which forms a fold line. A flap 136 covers opening 134 and is hinged at fold line 134*d* so that it can be bent inwardly for carrying of main body 12, along with handle opening 86.

With this arrangement, blank 18 is folded into a rectangular box configuration along fold lines 32, 36 and 40, so that rectangular panels 28, 30, 34 and 38 form the four sides of main body 12. Narrow strip 42 is folded along fold line 44 so as to be positioned inwardly of and in overlapping relation to the inner surface of rectangular panel 38 such that holes 46 and 48 are in alignment. Then, rivets 50 are positioned through holes 46 and 48 to secure the opposite edges together. In this configuration, main body 12 can be flattened, as shown in FIGS. 1 and 2 for easy shipping and storage.

Figure 7:
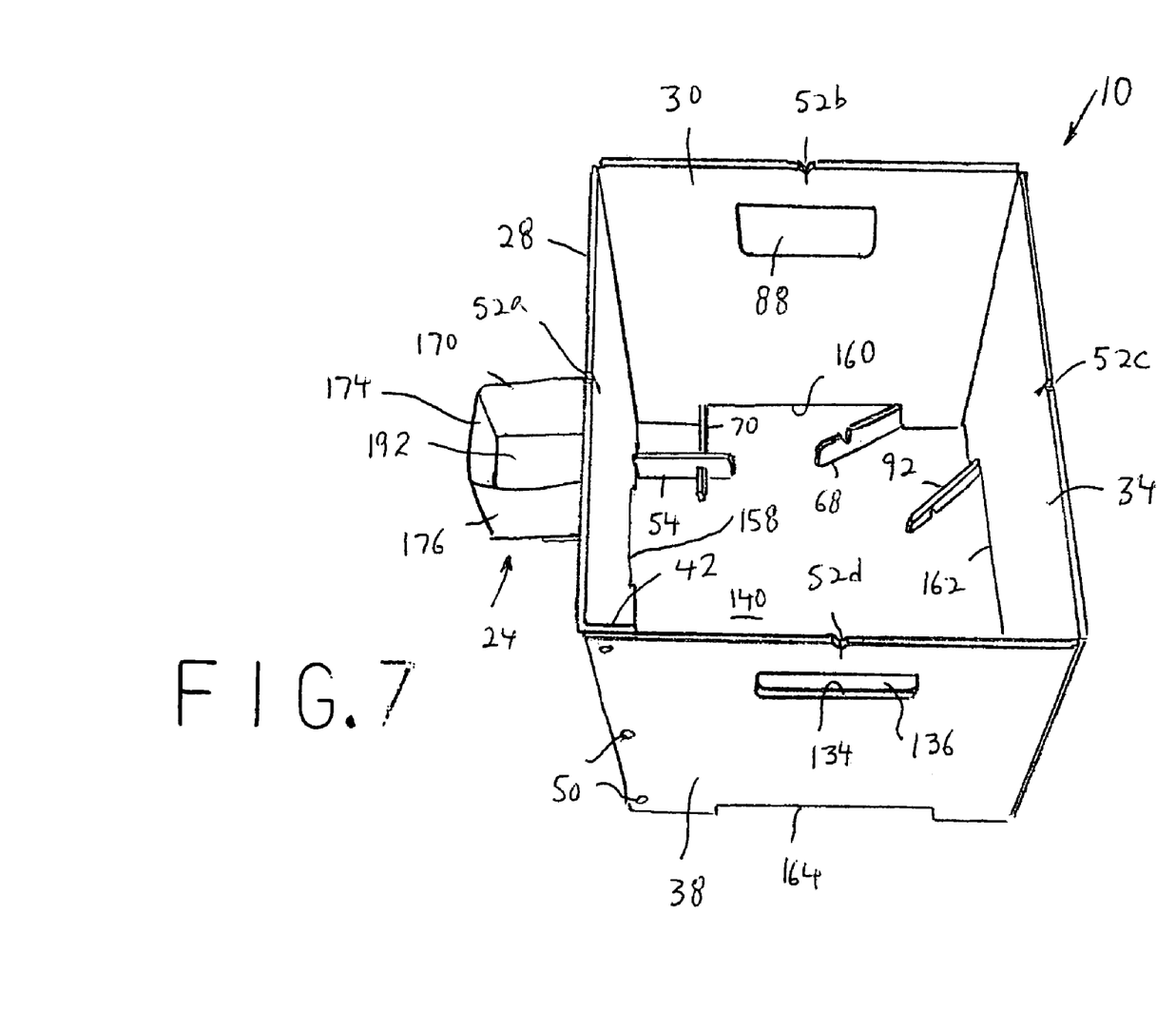
FIG. 7 is a top perspective view of the main body of the newspaper recycling container with the securing legs at one corner secured together.
Figure 8:
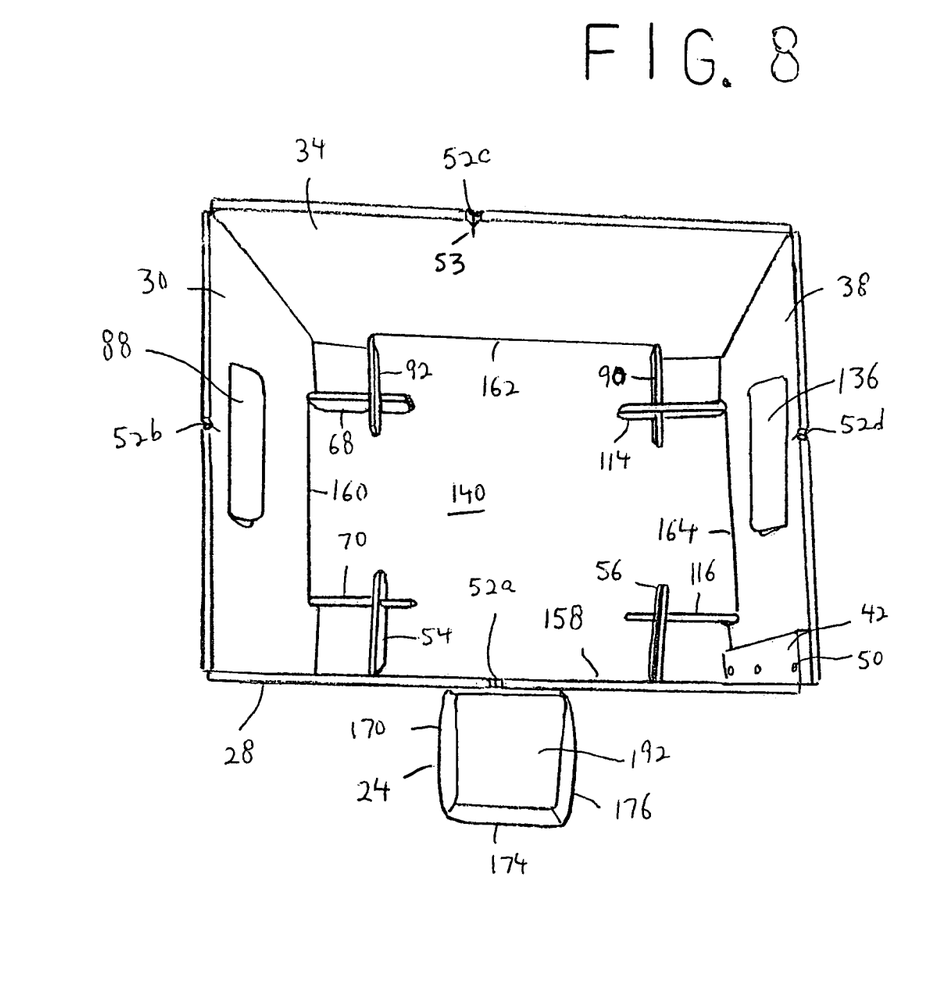
FIG. 8 is a top perspective view of the newspaper recycling container with the securing legs at all four corners secured together.

In order to maintain main body 12 in the open, rectangular configuration, the different tab sections are releasably connected together. Specifically, tab sections 56 and 112 are secured together by positioning recesses 64 and 126 into each other. In like manner, tab sections 54 and 70 are secured together by positioning recesses 64 and 82 into each other. Tab sections 68 and 92 are secured together by positioning recesses 82 and 108 into each other. Tab sections 90 and 114 are secured together by positioning recesses 104 and 130 into each other. In such case, the flanged openings of the recesses facilitate securing the tab sections together. When the tab sections are so secured together, main body 12 is retained in its rectangular configuration.

Figure 1:
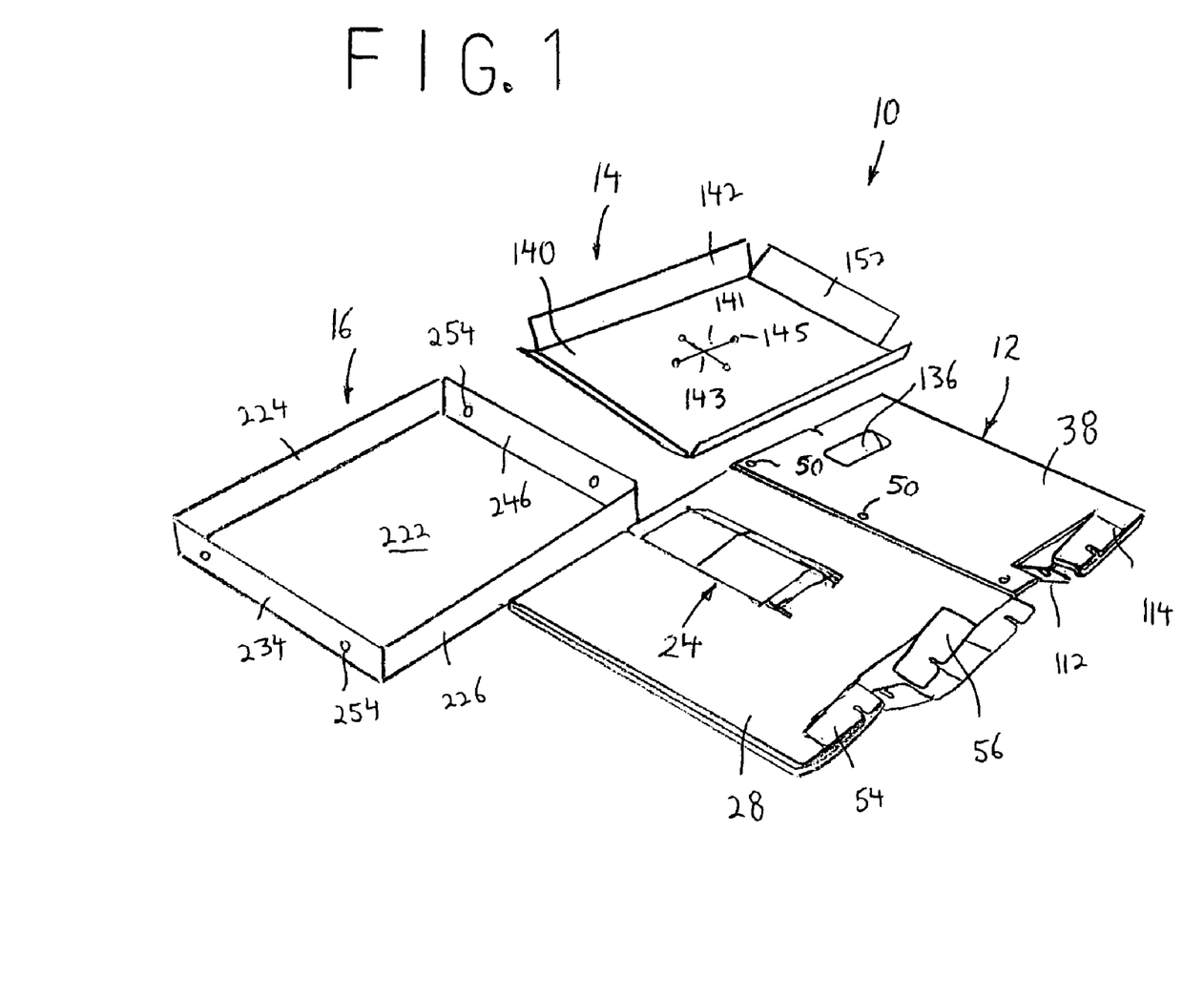
FIG. 1 is a perspective view of a newspaper recycling container according to the present invention in a knocked-down state.
Figure 2:
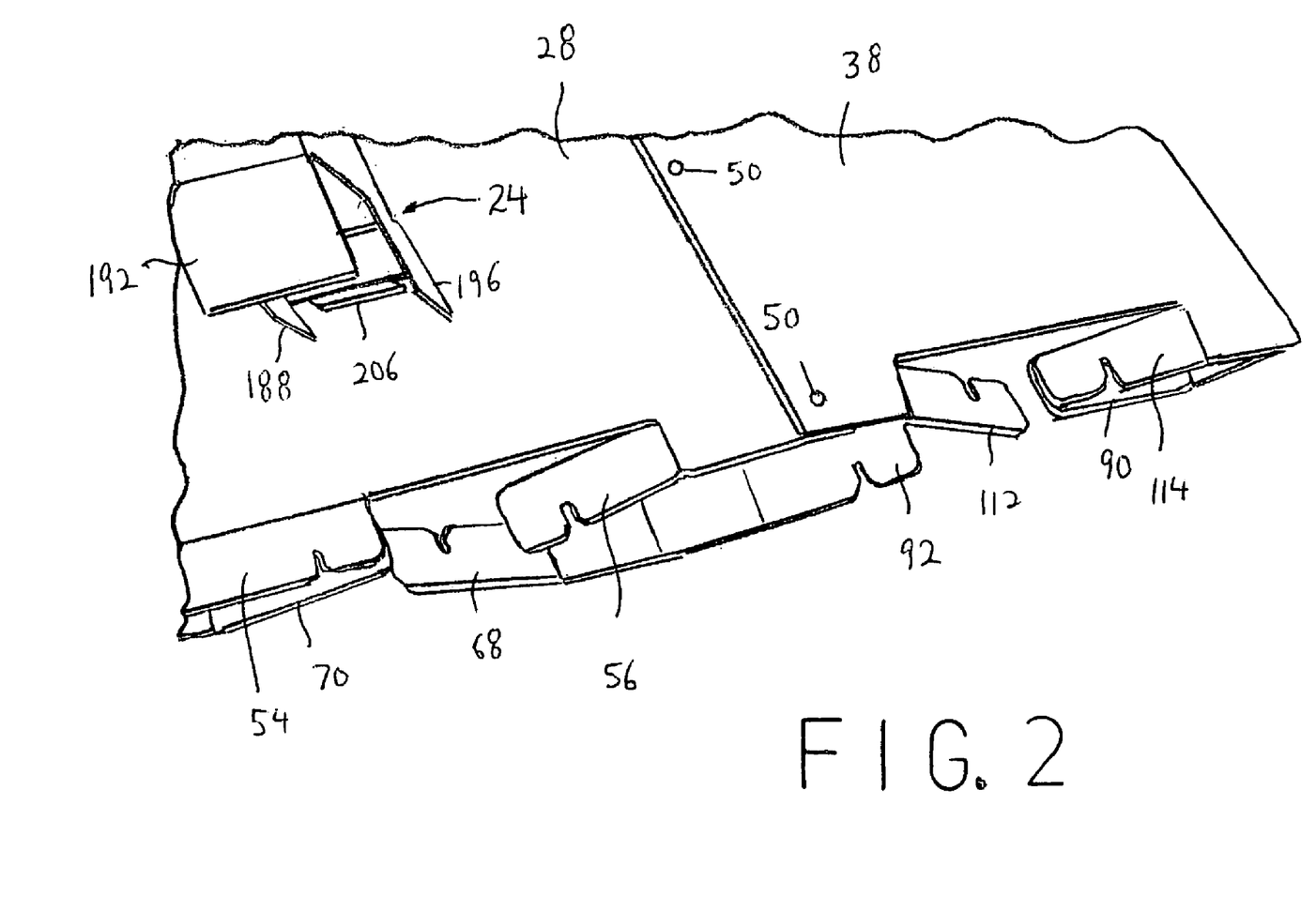
FIG. 2 is an enlarged perspective view of a portion of the main body of the newspaper recycling container.
Figure 10:
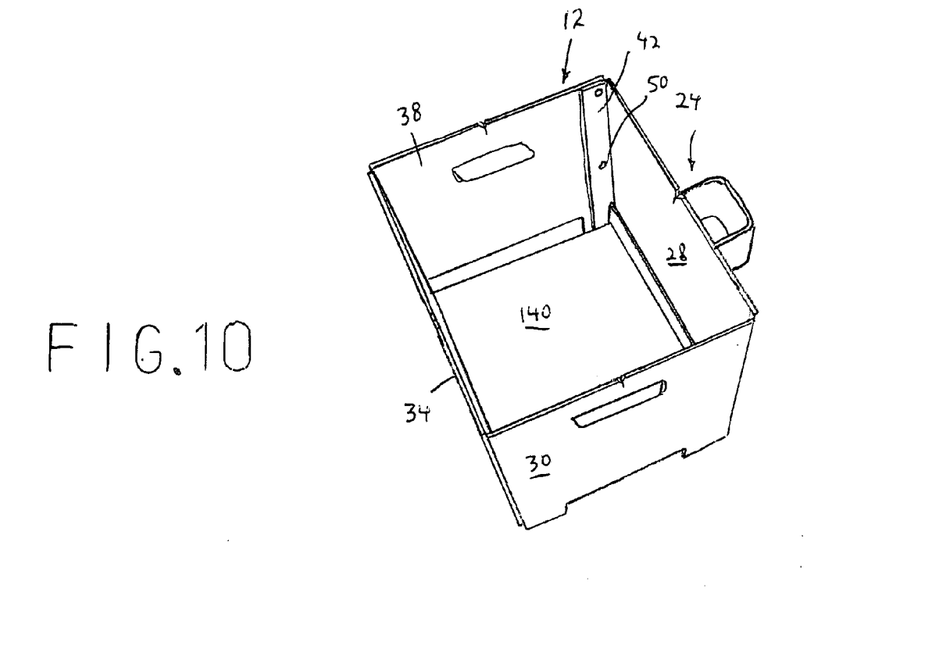
FIG. 10 is a top perspective view of the main body, string holder and bottom wall in an assembled state.

As shown in FIGS. 1, 4 and 10, blank 20 for forming bottom wall 14 includes a central rectangular panel 140 of substantially the same inner dimension as main body 12. Rectangular side flaps 142 and 144 are formed along side edges of central rectangular panel along fold lines 146 and 148, respectively, while rectangular end flaps 150 and 152 are formed along end edges of central rectangular panel 140 along fold lines 154 and 156, respectively. It is noted that flaps 142 and 144 extend along the entire length of the side edges of central rectangular panel 140 and that end flap 150 extends along the entire end edge of central rectangular panel 140. However, end flap 152 does not extend the entire length of the end edge of central rectangular panel 140 in order to accommodate the folded over narrow strip 142 of blank 18 which forms main body 12.

Preferably, rectangular panel 140 and flaps 142, 144, 150 and 152 are formed from a corrugated plastic material, and fold lines 146, 148, 154 and 156 are formed by living hinges.

In addition, central rectangular panel 140 includes four slits 141a–141d extending outwardly from a center point 143 and each perpendicular to an adjacent slit, each slit 141a–141d terminating in a respective small opening 145a–145d.

With this arrangement, flaps 142, 144, 150 and 152 are folded up at 90 degrees to central rectangular panel 140 along fold lines 146, 148, 154 and 156, respectively, whereupon the bottom surface of central rectangular panel 140 rests upon the secured tab sections of main body 12, and flaps 142, 144, 150 and 152 are in abutting contact with the inner surfaces of rectangular panels 34, 28, 30 and 38, respectively. Thus, bottom wall 14 also facilitates maintaining main body 12 in its rectangular box configuration.

It will be appreciated that the tab sections not only function to maintain main body 12 in its rectangular configuration, but also function to space bottom wall 14, and particularly, central rectangular panel 140 thereof, above ground surface by a distance equal to the width of the tab sections. In addition, when the tab sections are folded inwardly and secured to each other, they form central recesses 158, 160, 162 and 164 at the lower edges of rectangular panels 28, 30, 34 and 38, whereby any rainwater or the like can easily flow through main body 12 below bottom wall 14 so that no standing water is produced in newspaper recycling container 10.

In this assembled condition, as shown in FIG. 10, newspapers are placed on bottom wall 14 and stacked thereon. However, it is also desirable and necessary in many places to tie up the bundles of newspaper with string for recycling purposes. In this regard, notches 52a–52d are provided, whereby a first length of string can be positioned in notch 52a, with the string then extending down the inner side of rectangular panel 28, over the upper surface of central rectangular panel 140, up the inner side of rectangular panel 34 and through notch 52c. In like manner, a second length of string will have one end extending through notch 52b, down the inner side of rectangular side 30, over the upper surface of central rectangular panel 140, up the inner side of rectangular panel 38 and through notch 52d. The stacked newspapers will sit on the first and second lengths of string which extend along bottom wall 14. When it is time to bundle the newspapers, the opposite ends of the first length of string which are positioned within notches 52a and 52c, are tied together over the stack of newspapers and the ends of the second length of string that extend through notches 52b and 52d are tied together over the stack of newspapers. In this manner, the bundled and tied stack of newspapers can then be removed from main body 12 and carried curbside for recycling.

As discussed above, string holder 24 is secured to main body 12, and specifically, to the outer surface of rectangular panel 28 thereof in knocked-down form and can be assembled together thereon. As shown in FIG. 6, blank 26 for forming string holder 24 includes a first rectangular panel 170 connected along a fold line 172 to a second rectangular panel 174. The opposite edge of rectangular panel 174 is connected to a side edge of a third rectangular panel 176 along a fold line 178, and the opposite edge of rectangular panel 176 is connected to a fourth rectangular panel 180 along a fold line 182. The side edge of rectangular panel 170 opposite fold line 172 is connected along a fold line 184 to a narrow rectangular panel 186.

An inverted L-shaped flap 188 is secured to the lower edge of rectangular panel 170 along a fold line 190 such that the side edge 188a of the longer leg 188 thereof is in alignment with fold line 184 and the shorter leg 188b has an inclined edge 188c extending toward panel 174. A rectangular flap 192 is secured to the lower edge of rectangular panel 174 along a fold line 194, and has the same width as rectangular panel 174. Another inverted L-shaped flap 196 is secured to the lower edge of rectangular panel 176 along a fold line 198. One edge of longer leg 196a of inverted L-shaped flap 196 is in alignment with fold line 182, and the shorter leg 196b extends toward rectangular panel 174 and has an inclined edge 196c. A flap 200 includes a first rectangular panel 202 secured to the entire lower length of lower edge of rectangular panel along a fold line 204, and a rectangular tongue section 206 having a lesser width than first rectangular panel 202 is secured centrally to the opposite unsecured edge of first rectangular panel 202.

Preferably, rectangular panels 170, 174, 176 and 180 are formed from a corrugated plastic material, and fold lines 172, 178, 182 and 184 are formed by living hinges.

Further, narrow rectangular panel 186 is provided with two openings 208 and 210, and rectangular panel 180 is provided with three openings 211, 212 and 213. Rectangular panel 28 of blank 18 which forms main body 12 is formed with three openings 214, 216 and 218 with the same spacing as openings 211, 212 and 213, when string holder 24 is in its assembled configuration.

In this regard, blank 26 is folded along fold lines 172, 178 and 182 to form the same into a rectangular box configuration. Narrow panel 186 is then folded along fold line 184 so as to be positioned in abutting relation against the inner surface of rectangular panel 180 and such that openings 208 and 210 are in alignment with openings 211 and 213, respectively. Then, rivets 220 or the like are positioned through aligned openings 208, 211 and 214, through aligned openings 210, 213 and 216, and through aligned openings 212 and 218 in order to secure the partially assembled string holder 24 to rectangular panel 28 of blank 18. In this manner, string holder 24 in a partially assembled condition can be flattened with the flattening of main body 12, as shown in FIG. 1, for shipping and storage.

Figure 9:
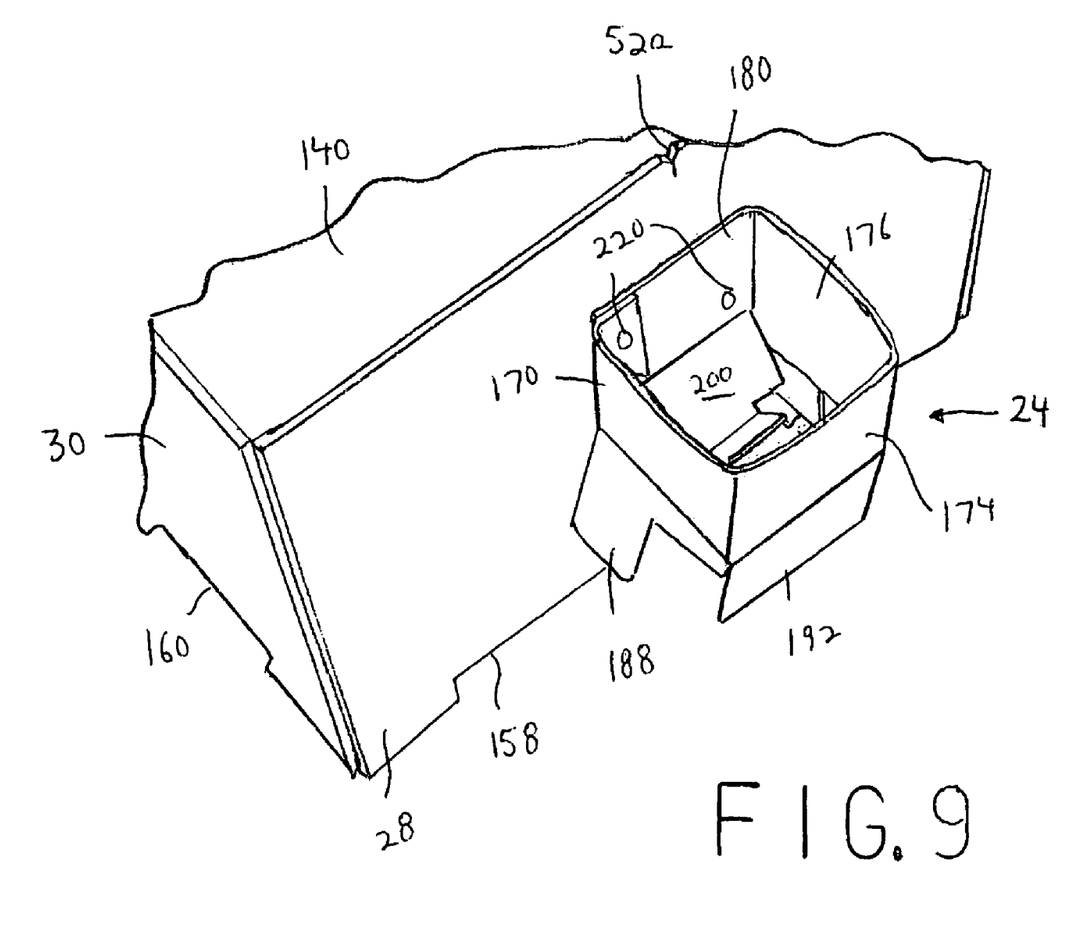
FIG. 9 is a perspective view of the string holder in a partially assembled state.

When main body 12 is assembled together, as discussed above, string holder 24 is also assembled together. Specifically, rectangular flap 192 is folded inwardly to form the bottom wall of string holder 24. Then, inverted L-shaped flaps 188 and 196 are folded inwardly, one over the other. Then, flap 200 is folded over the inverted L-shaped flaps 188 and 196, and tab extension 206 is folded between inverted L-shaped flaps 198 and 196 and rectangular flap 192. In this configuration, string holder 24 can hold a ball of string from which lengths can be cut for insertion in notches 52a–52d, as discussed above.

Referring to FIG. 5, blank 22 for forming top cover 16 includes a central rectangular panel 222 having opposite side flaps 224 and 226 connected to opposite side edges of central rectangular panel 222 by fold lines 228 and 230, respectively. Tab sections 232 are secured along fold lines 233 at opposite ends of side flaps 224 and 226, each having an opening 235 therein. In addition, end flaps 234 and 236 are connected to opposite end edges of central rectangular panel 222 along fold lines 238 and 240, respectively. A rectangular outer flap 242 is secured to the opposite longer edge of end flap 234 along a fold line 244, and a rectangular outer flap 246 is secured to the opposite longer edge of end flap 236 along a fold line 248.

Further, each of end flaps 234 and 236 and outer flaps 242 and 246 include two openings 250 and 252 in alignment with each other.

Figure 11:
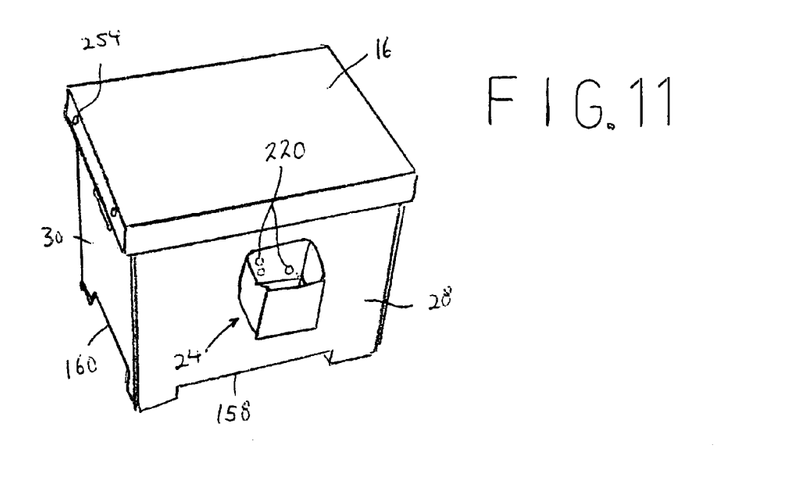
FIG. 11 is a perspective view of the newspaper recycling container in an assembled state with the top cover thereon.

Blank 22 is assembled into top cover 16 by first folding side flaps 224 and 226 about fold lines 228 and 230 by 90 degrees with respect to central rectangular panel 222 and then folding tab sections 232 inwardly in alignment over fold lines 238 and 240, respectively, along fold lines 233. Then, end flaps 234 and 236 are folded upwardly by 90 degrees so as to be positioned against the outer surfaces of tab sections 232, and outer flaps 242 and 246 are folded down over the inner surfaces of tab sections 232. In this orientation, openings 250 and the respective opening 235 are all in alignment with each other, and openings 252 and the respective opening 235 are also in alignment with each other, so that a rivet 254 or the like inserted therethrough secures blank 22 into the assembled configuration of top cover 16. Top cover 16 can then be positioned over the open upper surface of main body 12 to prevent rain and other elements from falling on the recycled newspapers within newspaper recycling container 10.

Preferably, rectangular panel 222, flaps 224, 226, 234, 236, 242 and 246, and tab sections 232 are formed from a corrugated plastic material, and fold lines 228, 230, 233, 238, 240, 244 and 248 are formed by living hinges.

It will be appreciated that since main body 12, bottom wall 14 and top cover 16 are preferably made from a corrugated plastic material, all of the fold lines are preferably formed by living hinges.

Figures 12, 13:
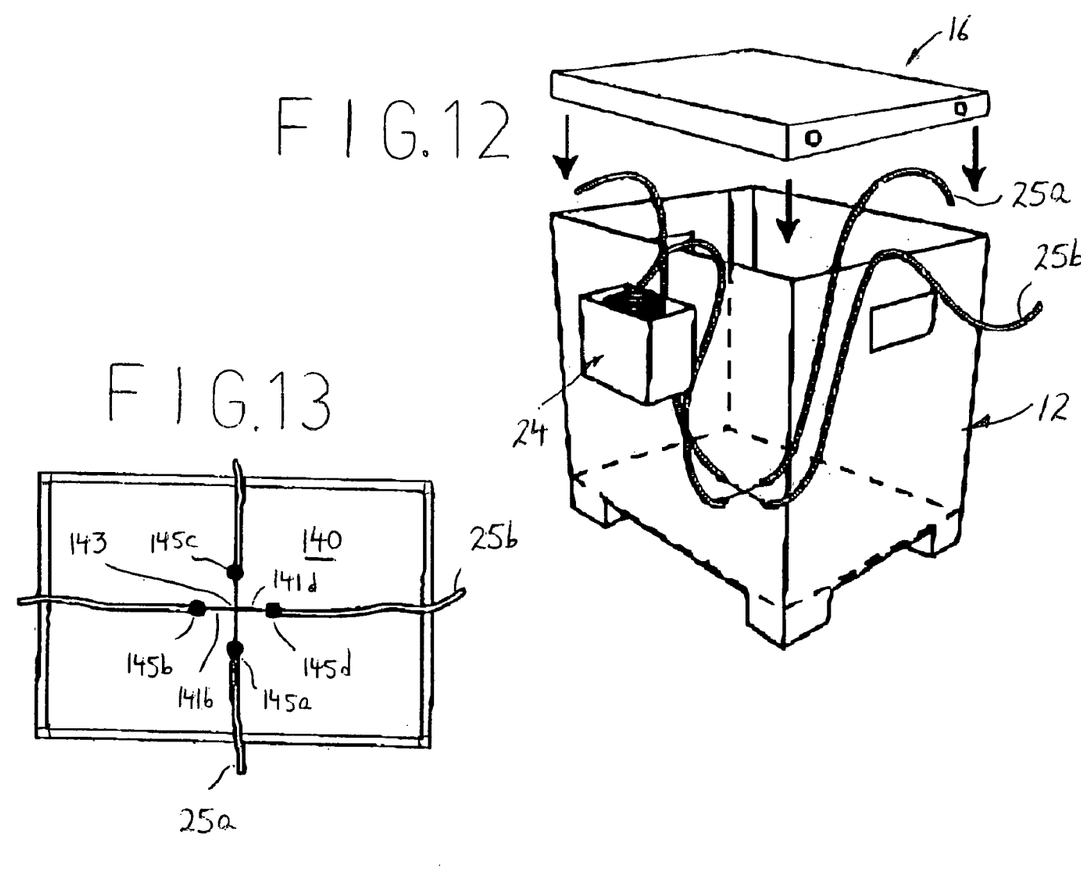
FIG. 12 is a perspective view of the newspaper recycling container in an assembled state, showing the string sections in position.
FIG. 13 is a top plan view of the bottom wall of the container of FIG. 12.

In operation, two sections 25a and 25b of string or twine held by string holder 24 are draped in criss-cross manner across the inside of container 10, as shown in FIGS. 12 and 13. Specifically, one string section 25a extends from notch 52a, down the inner side of panel 28, across panel 140, through small hole 145a, below slits 141a and 141c, up through small hole 145c, up the inner side of panel 34 and into notch 52c. The opposite ends of string section 25a are releasably held in notches 52a and 52c by pressing the same into slits 53 thereat. In like manner, the other string section 25b extends from notch 52b, down the inner side of panel 30, across panel 140, through small hole 145b, below slits 141b and 141d, up through small hole 145d, up the inner side of panel 38 and into notch 52d. The opposite ends of string section 25b are releasably held in notches 52b and 52d by pressing the same into slits 53 thereat. Then, the newspapers over time are placed in container on top of panel 140. When it is time to remove the same, the ends of string sections 25a and 25b in notches 52a–52d and slits 53 thereat, are removed and tied together around the newspapers to form a bundle. The bundle is lifted from container 10. At this time, because of the dimensions of slits 141a–141d and the friction created by flaps 142, 144, 150 and 152 on the inner surfaces of the walls of container 10, string sections 25a and 25b exit slits 141a–141d without lifting bottom wall 14 out of container 10. The above operation is then repeated for the next recycling operation.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A newspaper recycling container including:
    a main body having a peripheral sidewall formed by a plurality of panels hingedly connected together, the panels including inwardly bendable tab sections at lower edges thereof, each tab section being adapted to be bent inwardly and secured to a said tab section of an adjacent panel to retain the main body in a box-like configuration, the tab sections extending in a vertically oriented plane and having upper free edges;
    a bottom wall positioned on the upper free edges of said bent tab sections so as to be spaced above a ground surface on which said newspaper recycling container is positioned and to facilitate retention of said main body in said box-like configuration; and
    said tab sections of adjacent panels being connected together in a fixed position relative to one another in a manner such that the main body remains in said box-like configuration when the bottom wall is removed.

2. A newspaper recycling container according to claim 1, wherein said tab sections of adjacent panels are releasably connected together to maintain the main body in a predetermined configuration.

3. A newspaper recycling container according to claim 2, wherein adjacent tab sections have slits recesses for mating with recesses of tab sections of adjacent panels.

4. A newspaper recycling container according to claim 3, wherein at least some of said recesses include a flared opening to enable easy securement of said tab sections together.

5. A newspaper recycling container according to claim 1, wherein said tab sections are hingedly secured at fold lines adjacent lower edges of said panels such that said tab sections always remain in a vertically oriented plane when hingedly pivoted inwardly of said container.

6. A newspaper recycling container according to claim 1, wherein said panels are formed with recesses at lower edges thereof when said tab sections are bent inwardly and secured to adjacent panels.

7. A newspaper recycling container according to claim 1, further comprising a string holder secured to said main body, said string holder being formed in a box-like configuration with side walls, a bottom wall and an open upper end through which string can be inserted into and removed from the box-like string holder.

8. A newspaper recycling container according to claim 7, wherein said main body and said string holder can be oriented in a flattened state for shipping and storage.

9. A newspaper recycling container according to claim 1, further comprising a cover for covering said main body.

10. A newspaper recycling container according to claim 1, wherein said main body and said bottom wall are formed from a plastic material.

11. A newspaper recycling container according to claim 1, wherein the bottom wall includes a plurality of slits through which a string section can be releasably inserted.

12. A newspaper recycling container according to claim 1, wherein the peripheral side wall has a plurality of notches spaced therearound at an upper edge thereof for holding string sections.

13. A newspaper recycling container according to claim 12, wherein the peripheral side wall further includes a slit extending from a lower end of each notch.

14. A newspaper recycling container comprising:
    a main body having a peripheral sidewall formed by a plurality of panels hingedly connected together, the panels including tab sections at lower edges thereof which can be bent inwardly and secured to an adjacent panel to retain the main body in a box-like configuration; and a bottom wall positioned on said bent tab sections so as to be spaced above a ground surface on which said newspaper recycling container is positioned and to facilitate retention of said main body in said box-like configuration, the bottom wall including four slits through which a string section can be releasably inserted, each slit arranged perpendicular to an adjacent slit and all slits meeting at a center point.

15. A newspaper recycling container according to claim 14, wherein each slit terminates in a small opening in the bottom wall.

\* \* \* \* \*